United States Patent [19]

Akizawa et al.

[11] Patent Number: 5,548,724

[45] Date of Patent: Aug. 20, 1996

[54] FILE SERVER SYSTEM AND FILE ACCESS CONTROL METHOD OF THE SAME

[75] Inventors: Mitsuru Akizawa, Hachioji; Hirofumi Yamashita, Yokohama; Hisamitsu Kawaguchi, Sagamihara; Katsumi Tada; Kanji Kato, both of Yokohama; Akira Kito, Ebina; Hidenori Yamada, Hadano, all of Japan

[73] Assignees: Hitachi, Ltd., Tokyo; Hitachi Computer Engineering Co., Ltd., Kanagawa, both of Japan

[21] Appl. No.: 216,047

[22] Filed: Mar. 21, 1994

[30] Foreign Application Priority Data

Mar. 22, 1993 [JP] Japan .................................. 5-061602

[51] Int. Cl.$^6$ .................................................. H01J 13/00
[52] U.S. Cl. .................... 395/200.03; 395/650; 364/281; 364/DIG. 1
[58] Field of Search .......................... 395/200.1, 200.03, 395/200.08, 200.09, 650, 600; 364/281

[56] References Cited

U.S. PATENT DOCUMENTS

| | | | |
|---|---|---|---|
| 4,633,387 | 12/1986 | Hartung et al. | 395/650 |
| 4,887,204 | 12/1989 | Johnson et al. | 364/200 |
| 5,163,131 | 11/1992 | Row et al. | 395/200.01 |
| 5,276,879 | 1/1994 | Barry et al. | 395/650 |
| 5,341,351 | 8/1994 | Ng | 369/30 |
| 5,345,584 | 9/1994 | Hill | 395/600 |
| 5,355,453 | 10/1994 | Row et al. | 395/200.09 |
| 5,394,526 | 2/1995 | Crouse et al. | 395/200.01 |
| 5,398,336 | 3/1995 | Tantry et al. | 395/600 |

FOREIGN PATENT DOCUMENTS 4-48352   2/1992   Japan ............................... G06F 12/00

OTHER PUBLICATIONS

Managing NFS and NIS, Hal Stern, O'Reilly & Associates, Inc., Jun. 1991, pp. 113–159.

*Primary Examiner*—Kevin A. Kriess
*Assistant Examiner*—Dennis M. Butler
*Attorney, Agent, or Firm*—Fay, Sharpe, Beall, Fagan, Minnich & McKee

[57] ABSTRACT

A typical structure of a file server system is a file server system having a plurality of file servers connected in parallel on a network and sharing files placed distributedly in the file servers among a plurality of client computers, and there are provided in a specific file server among the plurality of file servers, a load information monitoring device for measuring respective loads of the plurality of file servers and a file access request distributing device for referring to the loads measured by the load information monitoring device so as to select a file server having a light load from the plurality of file servers having light loads, and distributing a file access request transmitted from client computers to the selected file server.

21 Claims, 15 Drawing Sheets

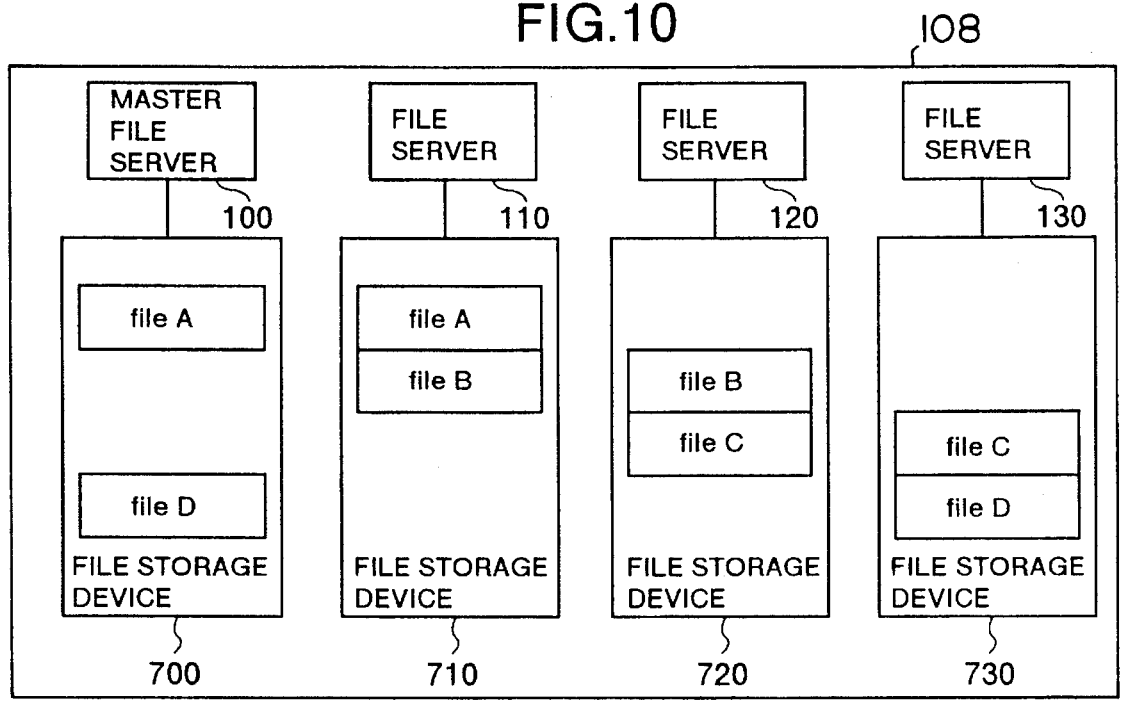
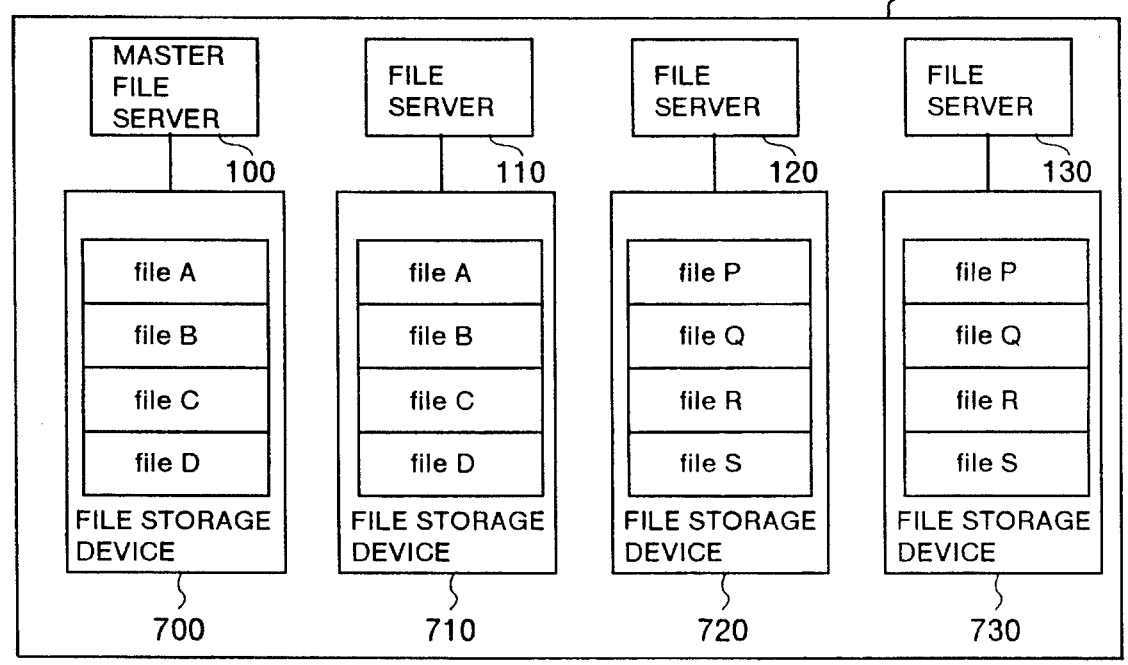

FILE SERVER SYSTEM AND FILE ACCESS CONTROL METHOD OF THE SAME

CROSS REFERENCE TO RELATED APPLICATION

The present invention relates to a patent application Ser. No. 08/024,462 entitled "HIGH-SPEED FILE ACCESS CONTROL METHOD AND COMPUTER SYSTEM" filed by M. Akizawa et al on Mar. 1, 1993.

BACKGROUND OF THE INVENTION

The present invention relates to a computer system such as a work stations and a server, and more particularly to a file server system for making access to a file stored in a secondary storage device at a high speed and a file access control method thereof in a computer system having a multiprocessor structure.

Formation of a computer into a network has been developed in recent years. Keeping step with this, demand for a file server for administrating a file shared among computers collectively is increasing. This is due to such a reason that a file system can be constructed at a low cost. Namely, it is due to such a fact that, since it becomes possible to share a file among a plurality of computers by using a file server, it becomes no longer required to make a plurality of copies of the same file among a plurality of computers and possess them. A network corresponding file system is normally loaded in a file server, and it becomes possible to make access as if it were a file stored in a client computer itself by also loading a network corresponding file system access program in a computer on a client side connected to the same network. As a result, it becomes possible to make access to a file stored and controlled in the file server from any client computer connected to the network, and sharing of a file among a plurality of client computers is realized.

A network corresponding file system is described in Managing NFS and NIS (Hal Stern, O'Reilly & Associates, Inc. June 1991, p. 113 to p. 159).

However, a problem in point of performance is produced sometimes when a file in a file server is shared by using a network corresponding file system. Namely, when file access is made from a plurality of client computers at the same time, the load is concentrated to the file server, thus generating such a situation that access results cannot be obtained immediately.

Therefore, when the load to the file server becomes excessive and an access throughput of the client computer is lowered, it has been performed so that a plurality units of file servers are connected in parallel in the network so as to distribute the access demand from a plurality of client computers. Respective client computers control information on all file servers installed on the network and issue an access request to a file server where an access objective file is in existence by referring to the control information. With this, when access objective files of respective client computers are stored in separate file servers, it becomes possible to distribute load, thus improving the access throughput.

Although it is not of a client-and-server structure, a system which resembles the system mentioned above in points that one main processor controls the whole of plurality of data files and these data files are arranged distributedly in a plurality of sub-processors is described in JP-A-4-48352.

SUMMARY OF THE INVENTION

Even when a file is shared among a plurality of client computers by installing a plurality of file servers as described above, following problems remain unsolved.

Since a client computer makes access to a file server where a file exists quite independently of a load situation of the file server, such a problem is encountered that a plurality of client computers issue an access request to one file server simultaneously sometimes, the file server concerned causes a bottleneck in that case, and the throughput is lowered. In particular, when a plurality of client computers make access to the same directory or the same file at the same time, the performance thereof is deteriorated extremely. This problem cannot be solved from the viewpoint of the nature thereof even if the number of installed file servers is increased.

It is an object of the present invention to provide a file access control method and a unit thereof capable of preventing generation of a bottleneck due to concentration of access to a specific file server and lowering of the throughput attendant thereupon even when a plurality of client computers make access to the same directory or file in a network where a plurality of file servers are connected in parallel for sharing a file among a plurality of client computers.

One of the features of a file access control method according to the present invention exists in a file access control method including the steps of, in a file server system having a plurality of file servers connected in parallel on a network and sharing files arranged distributedly in the plurality of file servers among a plurality of client computers, measuring respective load information of the plurality of file servers, selecting the file server for making file access by referring to the load information when the file access request issued from a client computer through the network is received, and distributing the file access request to the selected file server.

To be more concrete, when a file access request from a client computer is a request for writing a new file, the load information of a plurality of file servers is measured so as to select a file server having the lightest load, and a file write request is issued to the file server. Or, when a file of a mirror structure is produced, a plurality of file servers each having a light load are selected, and a file write request is issued to each of these file servers. Further, when the file access request from the client computer is a file read request and the read objective file is of a mirror structure, the load information of the plurality of file servers taking charge of respective plurality of file storage devices where the read objective files are stored is measured so as to select one file server having the lightest load, and a file read request is issued to the file server.

The load information is measured by counting the number of respective file access requests left unprocessed of the plurality of file servers. For such a purpose, at least one of the plurality of file servers is used as a master file server, and a load information monitoring means for recording and renewing the number of respective file access requests left unprocessed of the plurality of file servers in a load information table is provided in this master file server. Further, in this master file server, there is provided a means for distributing the file access request from the client computer using a file attribute table for recording correspondence relationship between respective files and file servers taking charge of write of these files, a load information table and a file attribute table.

A typical structure of a file server system according to the present invention is such that, in a file server system having a plurality of file servers connected in parallel on a network and sharing files installed distributedly in the file servers among a plurality of client computers, there are provided, in each of the plurality of file servers, a file storage means for storing files, a first communication control means for controlling communication with another file server through the network and a file access control means for receiving a file access request and making file access to the file storage means, and on the other hand, there are provided further in addition to the above, in a specific file server among the plurality of file servers, a second communication control means for controlling communication with the client computer mentioned above, a remote file access processing means for administrating communication protocol of the file access request issued from the client computer, a load information monitoring means for measuring respective loads of the plurality of file servers, and a file access request distributing means for selecting a file server making file access from the plurality of file servers by referring to the loads measured by the load information monitoring means, issuing a file access request to the file access control means of its own file server when the selected file server is its own file server, and issuing a file access request to the file access control means of the selected file server through the first communication control means when the selected file server is another file server.

According to the present invention as described above, it is possible to make access to a file server having little file access load. Moreover, it is also possible to distribute the access request from a client computer for the same directory or file among a plurality of file servers in accordance with the loads thereof since files and duplicate files thereof are stored in the plurality of file servers. Namely, when a plurality of file servers are connected in parallel on a network so as to share a file among a plurality of client computers, it is possible to prevent generation of a bottleneck due to concentration of access to a specific file server and lowering of the throughput attendant thereupon, thus making it possible to realize access of high throughput from a client computer even when a plurality of client computers make access to the same directory or file at the same time.

BRIEF DESCRIPTION OF THE DRAWINGS

FIG. 10 is a conceptual diagram showing an example of a file storage configuration in the embodiment;

FIG. 11 is a conceptual diagram showing another example of the file storage configuration in the embodiment.

DESCRIPTION OF THE PREFERRED EMBODIMENTS

Figure 1:
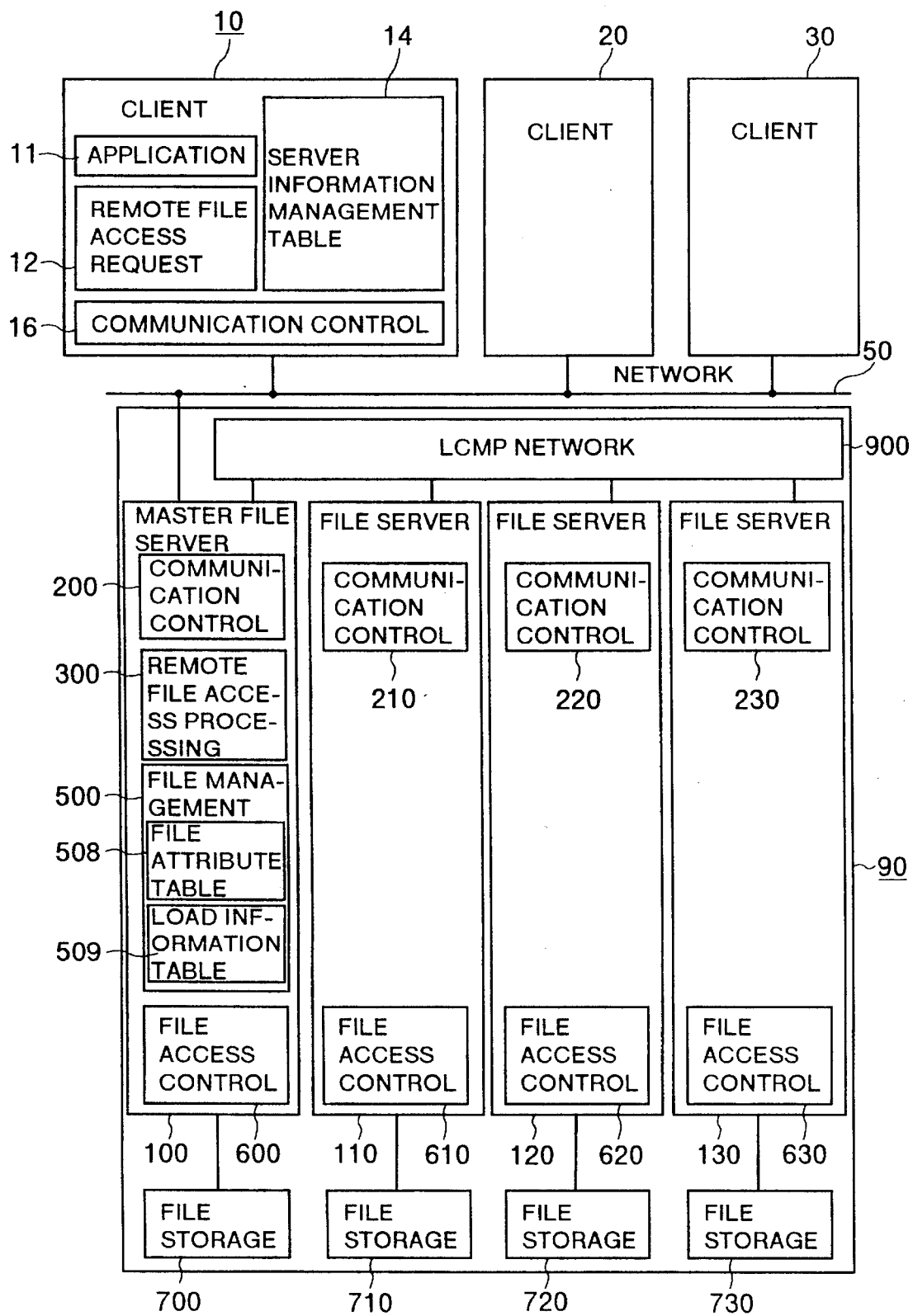
FIG. 1 is a block diagram showing a general structure of an embodiment according to the present invention.

A structure of an embodiment according to the present invention will be described with reference to FIG. 1.

A file server system 90 formed of a loosely coupled multiprocessor and client computers 10, 20 and 30 are connected by a local area network 50. In each of the client computers 10, 20 and 30, an application program 11 is executed, and, when a file access request is generated with the above, a file access request is issued from a remote file access request generating means 12 to the file server system 90. To be concrete, the file access request is transmitted to a file server 100 which is specific one of four units of file servers 100, 110, 120 and 130 forming the file server system 90 from a communication control means 16 through the local area network 50. Each of the four units of file servers 100, 110, 120 and 130 takes charge of access to file storage means 700, 710, 720 and 730 individually. To that end, file access control means 600, 610, 620 and 630 are formed in the file servers 100, 110, 120 and 130, respectively. Further, the file servers 100, 110, 120 and 130 communicate with one another through a loosely coupled microprocessor (LCMP) network 900. For such a purpose, communication control means 200, 210, 220 and 230 are formed in respective file servers.

In the present embodiment, the specific file server 100 is called a master file server. In the master file server 100, a remote file access processing means 300 for receiving a file access request issued from a client computer and a file control means 500 for controlling distributed placement of the files so that the load of individual file server is not deviated largely, and distributing the received file access request to individual file server are formed further. For such file control and distribution of file access request, a file attribute table 508 and a load information table 509 are used. In a server information control table 14 of a client computer, information on the master file server 100, that is, machine addresses of the master file server 100 are stored.

Figure 2:
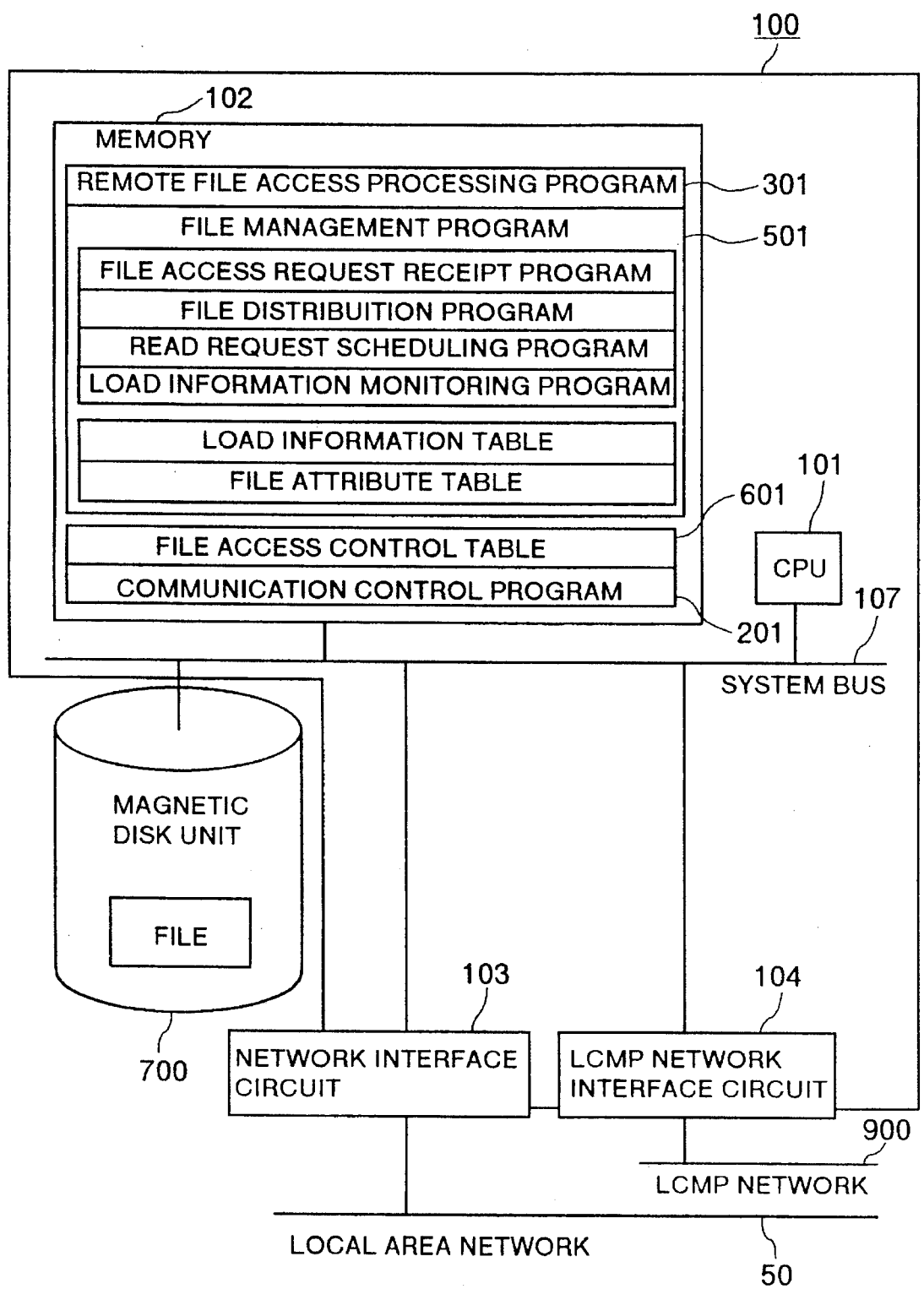
FIG. 2 is a block diagram showing a detailed structure of a principal part of the embodiment.

FIG. 2 is a block diagram showing a device structure of the master file server 100. The master file server 100 includes a processor 101, a main memory 102, a network interface circuit 103 and an LCMP network interface circuit 104 connected to one another by a system bus 107. A remote file access processing program 301, a file control program 501, a file access control program 601 and a communication control program 201 are loaded onto a main memory 102 from a secondary storage device not illustrated, respectively, at time of building up the system, thereby to form the remote file access processing means 300, the file control means 500, the file access control means 600 and the communication control means 200 shown in FIG. 1. The file storage means 700 for which the master file server 100 takes charge of write-read thereof is a magnetic disk unit as shown in FIG. 2 and is connected to the system bus 107. Besides, it does not matter if the file storage means 700 is a magneto-optic disk unit, an optical disk unit or the other secondary storage device.

The file servers 110, 120 and 130 other than the master file server 100 in FIG. 1 also have a structure almost similar to that shown in FIG. 2. In the main memories thereof, however, the remote file access program and the file control program are not loaded. Further, the network interface circuit 103 for connection to the local area network 50 is neither required.

Figure 3:
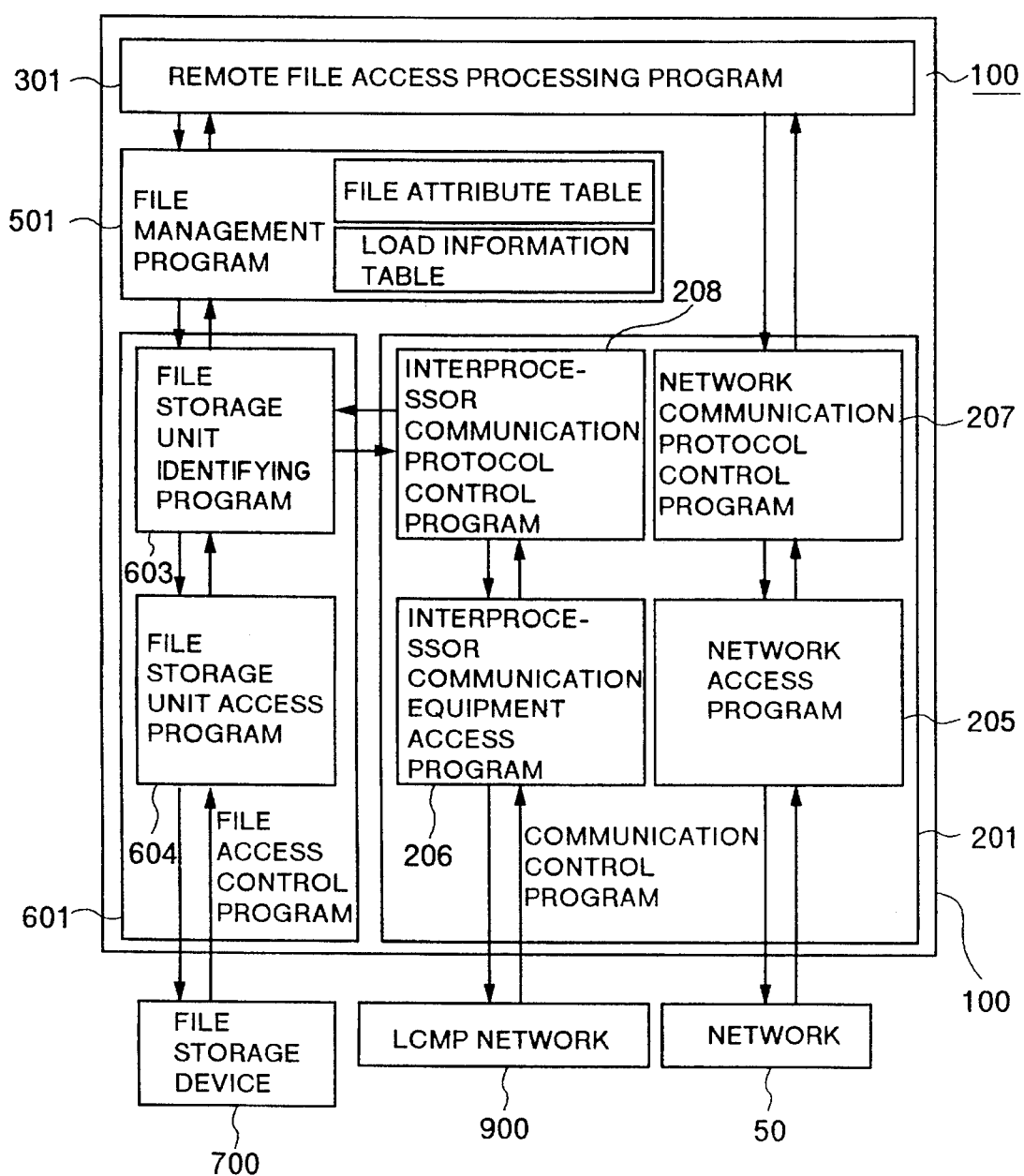
FIG. 3 is a block diagram showing a program structure of a master file server of the embodiment.

FIG. 3 shows a program structure of the master file server 100. The communication control program 201 is composed of a network access program 205 which becomes an interface between the local area network 50 and the master file server 100, an interprocessor communication device access program 206 which becomes an interface between the LCMP network 900 and the master file server 100, a network communication protocol control program 207 for delivering a request received from the network access program 205 after protocol conversion so that the remote file access processing program 301 may interpret and an interprocessor communication protocol control program 208 for delivering an access request to another file server interpreted by a file access control program 601 which will be described later to the interprocessor communication device access program 206 after protocol conversion. The file access control program 601 is composed of a file storage device identifying program 603 for receiving information on the file storage device and the file server from the file control program 501, and delivering information on the file storage device to the file storage device access program 604 when access is made to the file storage means 700 for which its own processor 101 takes charge of access control, and delivering information on the file storage device to the interprocessor communication protocol control program 208 when access is made to file storage devices 710 to 730 for which other file servers 110 to 130 take charge of access control so as to request access to other file servers, and a file storage device access program 604 for receiving information on the file storage device from the file storage device identifying program 603 and making access to the magnetic disk unit 700 for storing an objective file.

Figure 4:
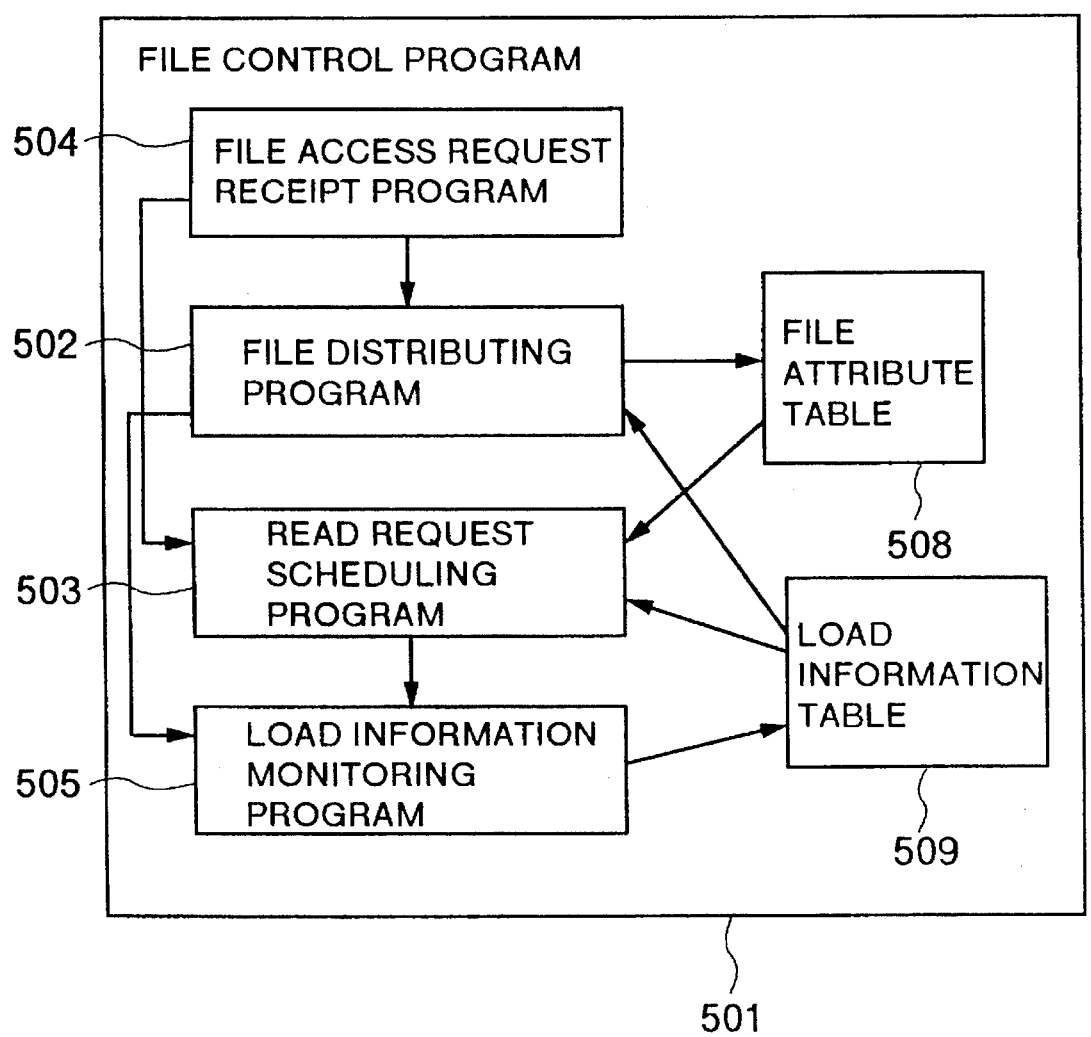
FIG. 4 is a block diagram showing a structure of a file control program of the embodiment.

The file control program 501 will be described with reference to FIG. 4 which shows a more detailed program structure. The file control program 501 administers a file attribute table 508 and a load information table 509, and delivers a file access request delivered from the remote file access processing program 301 to the file access control program 601 after converting the file access request into information on the file server, information on the file storage device and information on a file storage position in the file storage device using those tables described above. Processings of distributed placement of files and selection of the access objective file server in accordance therewith are performed. For that purpose, the file control program 501 is composed of a file access request receipt program 504 for receiving a file access request delivered from the remote file access processing program 301 and determining whether the request is a write request or a read request, a file distributing program 502 for determining by which file server the file is to be written at file write time, a read request scheduling program 503 for determining to which file server access is to be made at read time and a load information monitoring program 505 for measuring the loads of respective file servers by counting the number of access requests left unprocessed of respective file servers. In the file attribute table 508, a file server identifier where files are stored corresponding to respective files, a file storage device identifier and information on file storage positions in the file storage device are held. The number of access requests left unprocessed of respective file servers is held in the load information table 509.

Figure 5:
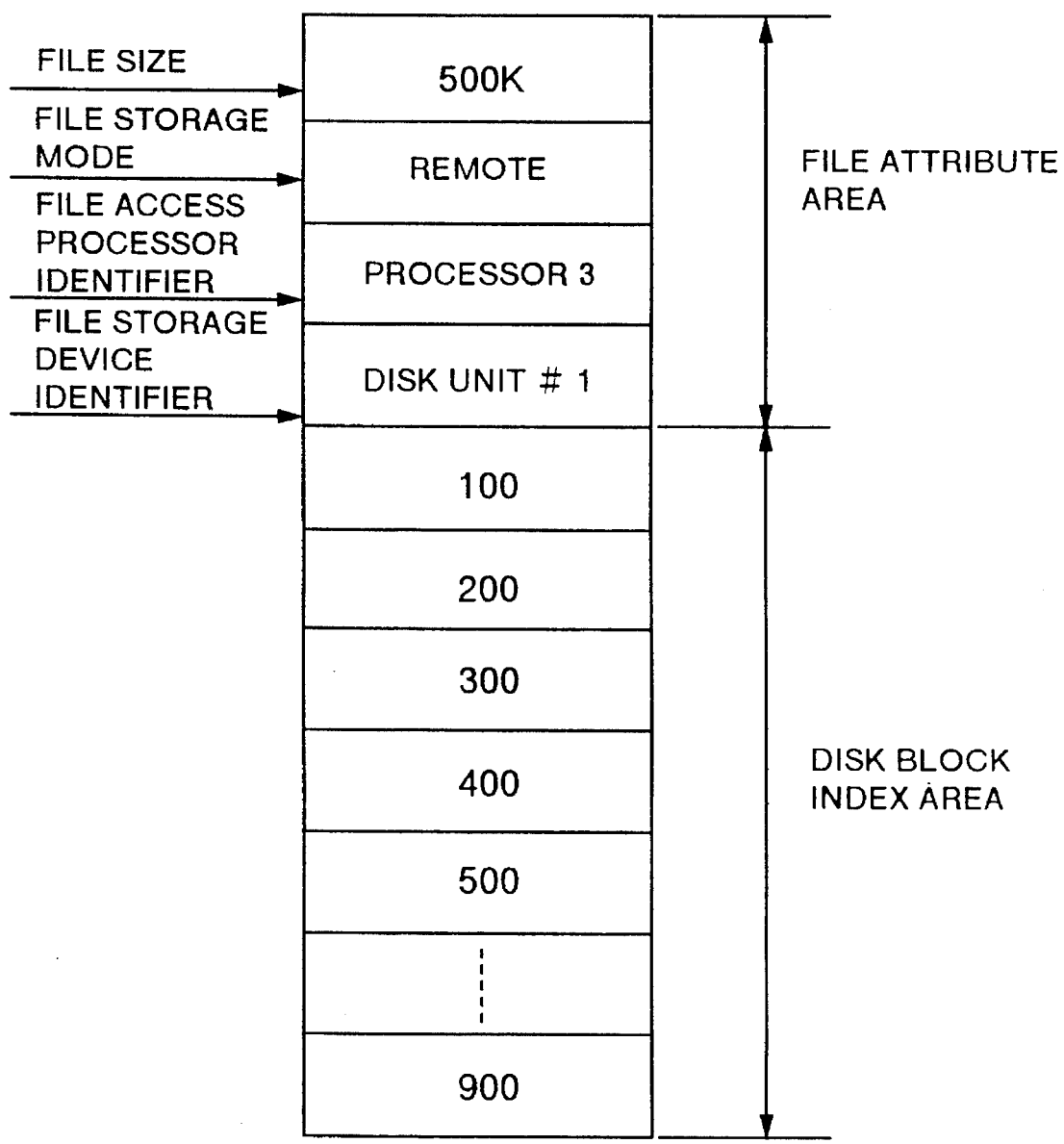
FIG. 5 is a conceptual diagram showing an example of a file attribute table in the embodiment.

Next, a first example of the file attribute table is shown in FIG. 5. This example shows a case that distributed placement is made in file unit without dividing one file or without having duplicates. The file attribute table is composed of two areas, i.e., (1) a file attribute area and (2) a disk block index area. The file attribute area is composed of respective entries of a file size, a file storage mode, a file access processor identifier and a file storage device identifier. The file storage modes include local and remote, which show whether the file is stored in a file storage device for which its own file server administering the file attribute table takes charge of access control or the file is stored in a file storage device for which another file server takes charge of access control. The file access processor identifier shows an identifier of a file server which takes charge of access control of the file storage device where the file corresponding to the file attribute table is stored. The file storage device identifier shows a file storage device where the file is stored. The disk block index area is formed of indexes showing positions of a series of respective disk blocks forming the file in the file storage device.

Figure 6:
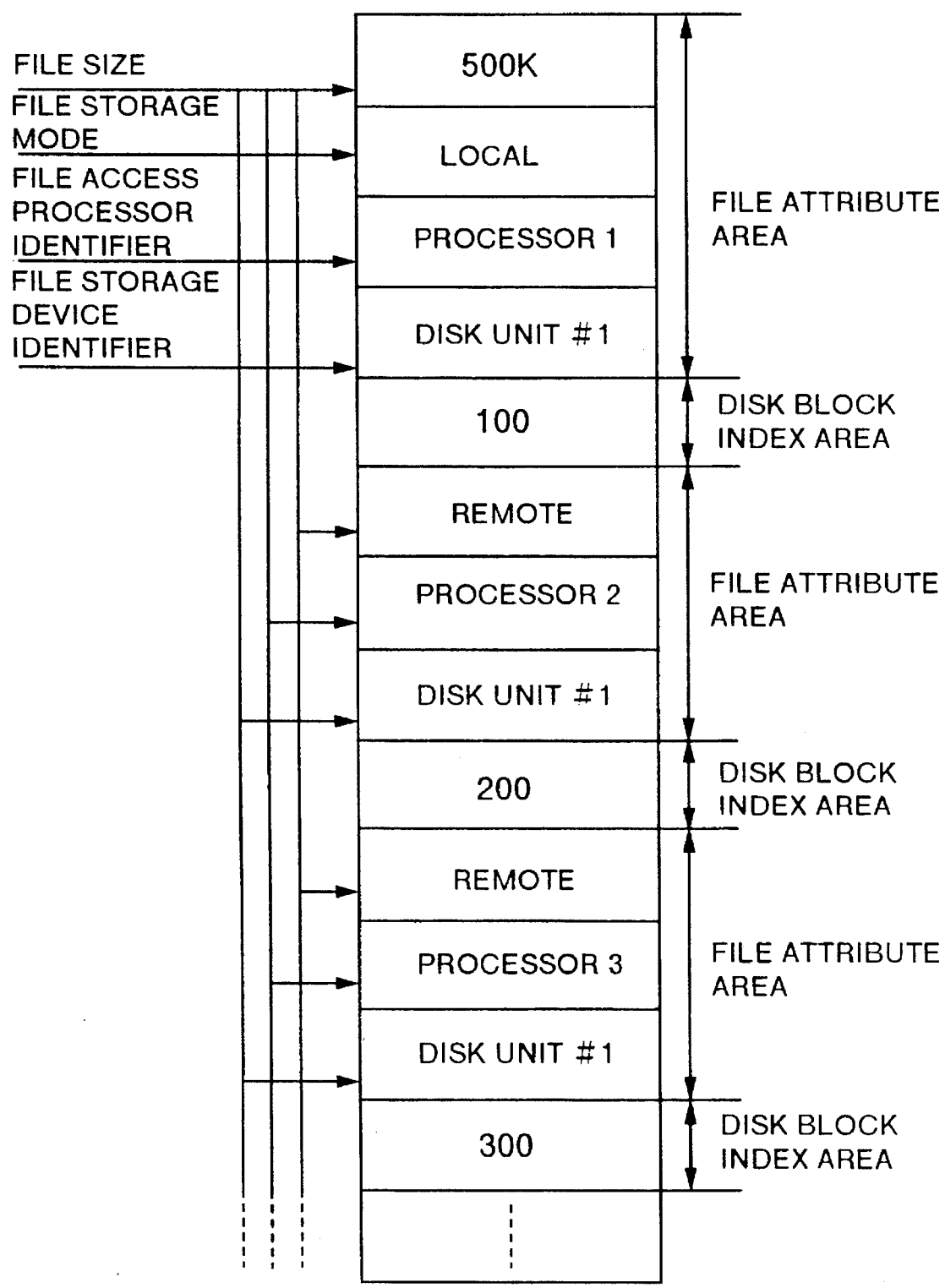
FIG. 6 is a conceptual diagram showing another example of the file attribute table in the embodiment.

Next, a second example of the file attribute table is shown in FIG. 6. This example shows a case that distribution is made by dividing one file. The file attribute table is composed of two areas, that is, (1) a file attribute area and (2) a disk block index area similarly to the first example shown in FIG. 5. However, the file attribute area exists in every disk block, whereby to designate the storage location. In the example shown in FIG. 6, it is shown that a first data block forming the file exists at the position of the index No. 100 of a disk unit No. 1 where the first file server performs access control. Thereinafter, it is shown that the second data block exists at a position of an index No. 200 of the disk unit No. 1 where the second file server performs access control and the third data block exists at a position of an index No. 300 of the disk unit No. 1 where the third file server performs access control.

Figure 7:
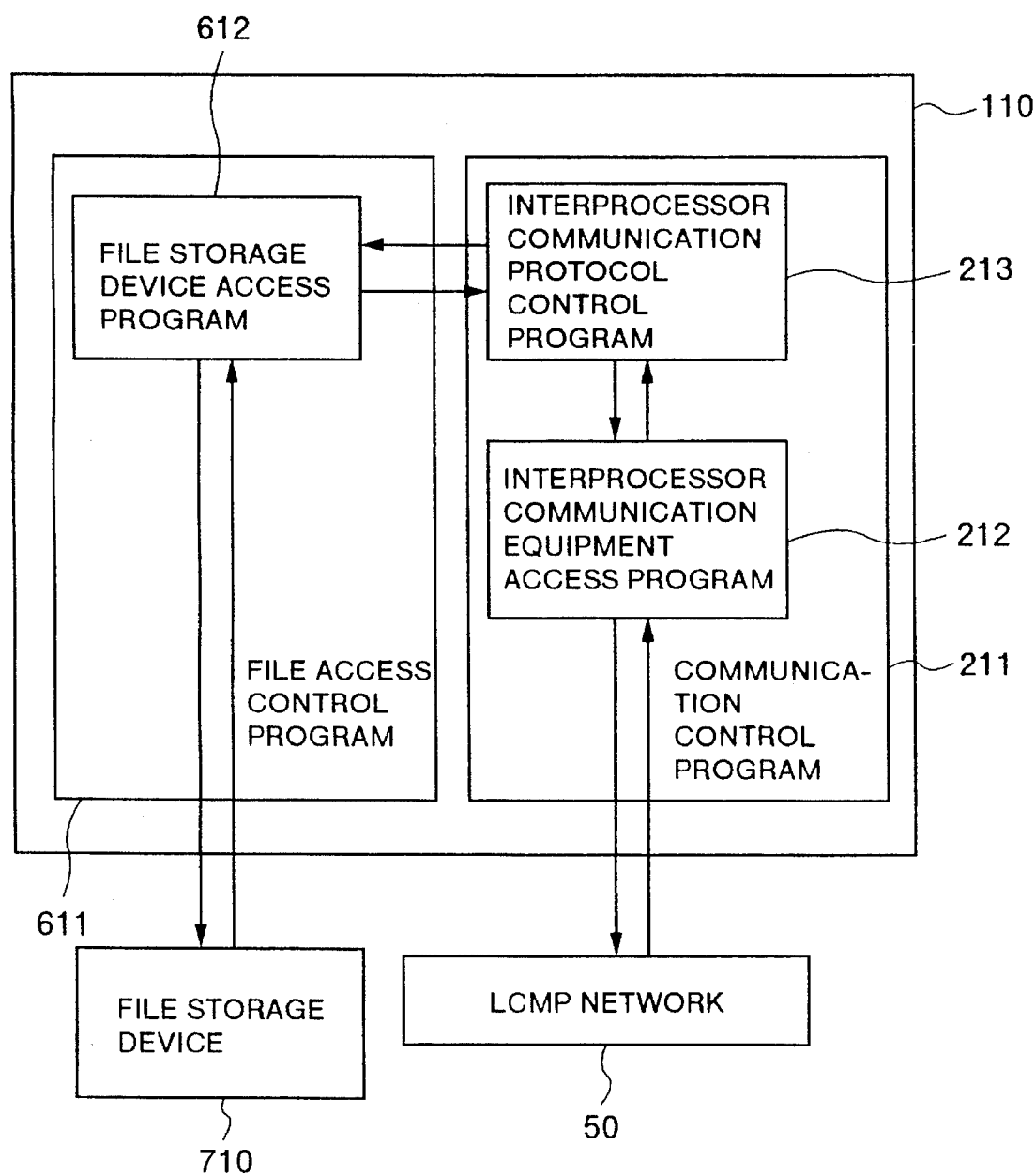
FIG. 7 is a block diagram showing a program structure of another file server of the embodiment.

On the other hand, a program structure of the file server 110 is shown in FIG. 7. A communication control program 211 is composed of an interprocessor communication device access program 212 which becomes an interface between the LCMP network 900 and the master file server 100 and an interprocessor communication protocol control program 213 for delivering the access request received from the interprocessor communication device access program 206 after protocol conversion thereof so that a file access control program 611 may interpret the access request. The file access control program 611 is formed of a file storage device access program 612 for interpreting the access request received from the interprocessor communication protocol control program 213 and making access to a magnetic disk unit 710 for storing the objective file. The program structure of the file servers 120 and 130 is quite similar to that shown in FIG. 7.

Next, the operation of the present embodiment will be described with reference to FIG. 8.

When a file access request or a processing request including file access is generated through execution of an application program 11 in any client computers 10, 20 and 30, a remote file access request program 13 is activated, and the processing request is transmitted to a master file server 100 through the local area network 50. The communication through the local area network 50 is executed by using communication control programs 17 and 201 loaded on the client computer and the master file server 100, respectively. When the file access request is sent to the master file server 100, a remote file access processing program 301 of the file server 100 is activated. In the remote file access processing program 301, received contents are analyzed thereby to extract a file access request from the client computer, and the file access processing request is sent to a file control program 501.

Figure 9:
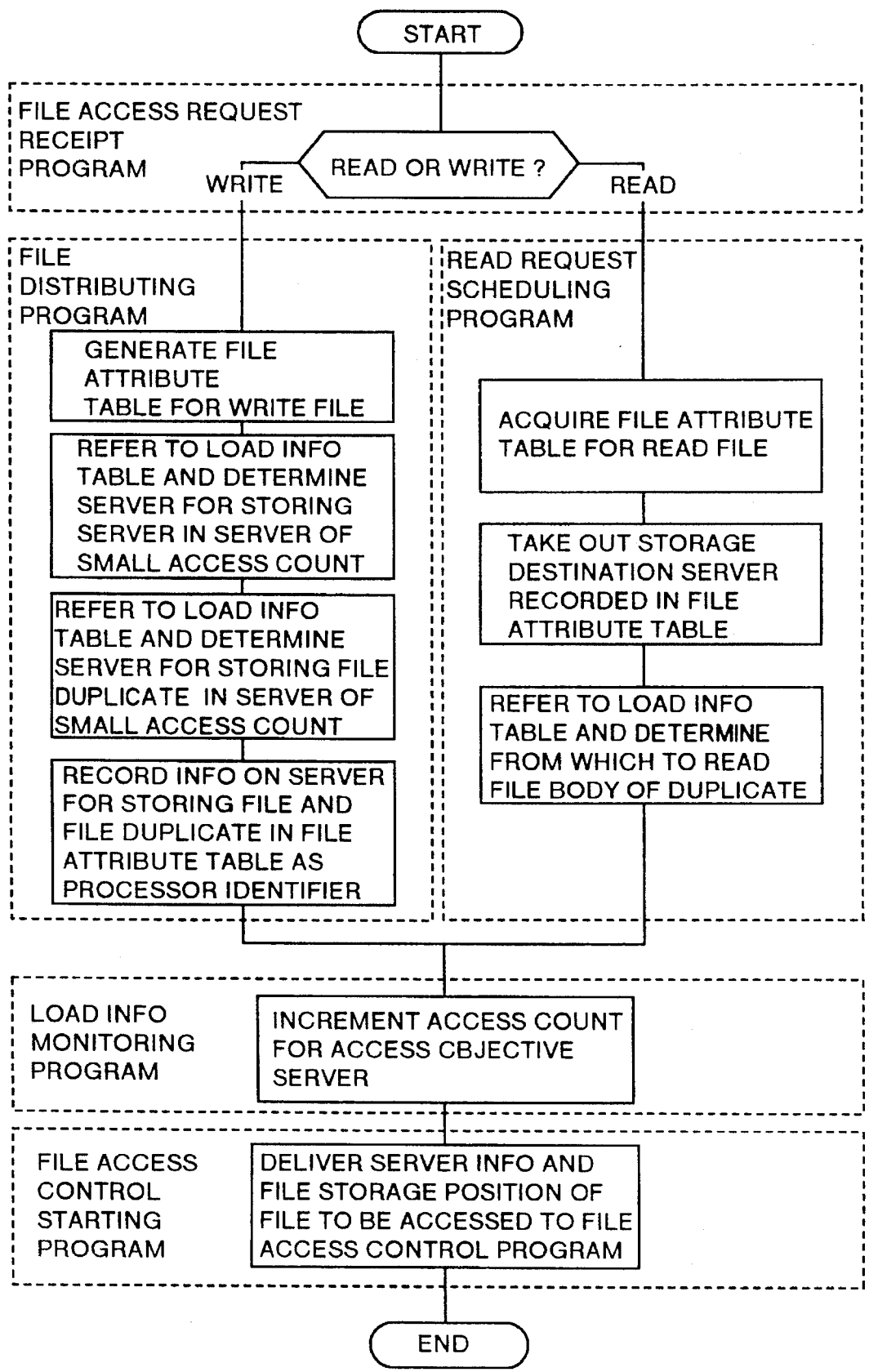
FIG. 9 is a flow chart showing the flow of processing of a file control program in the embodiment.
Figure 12:
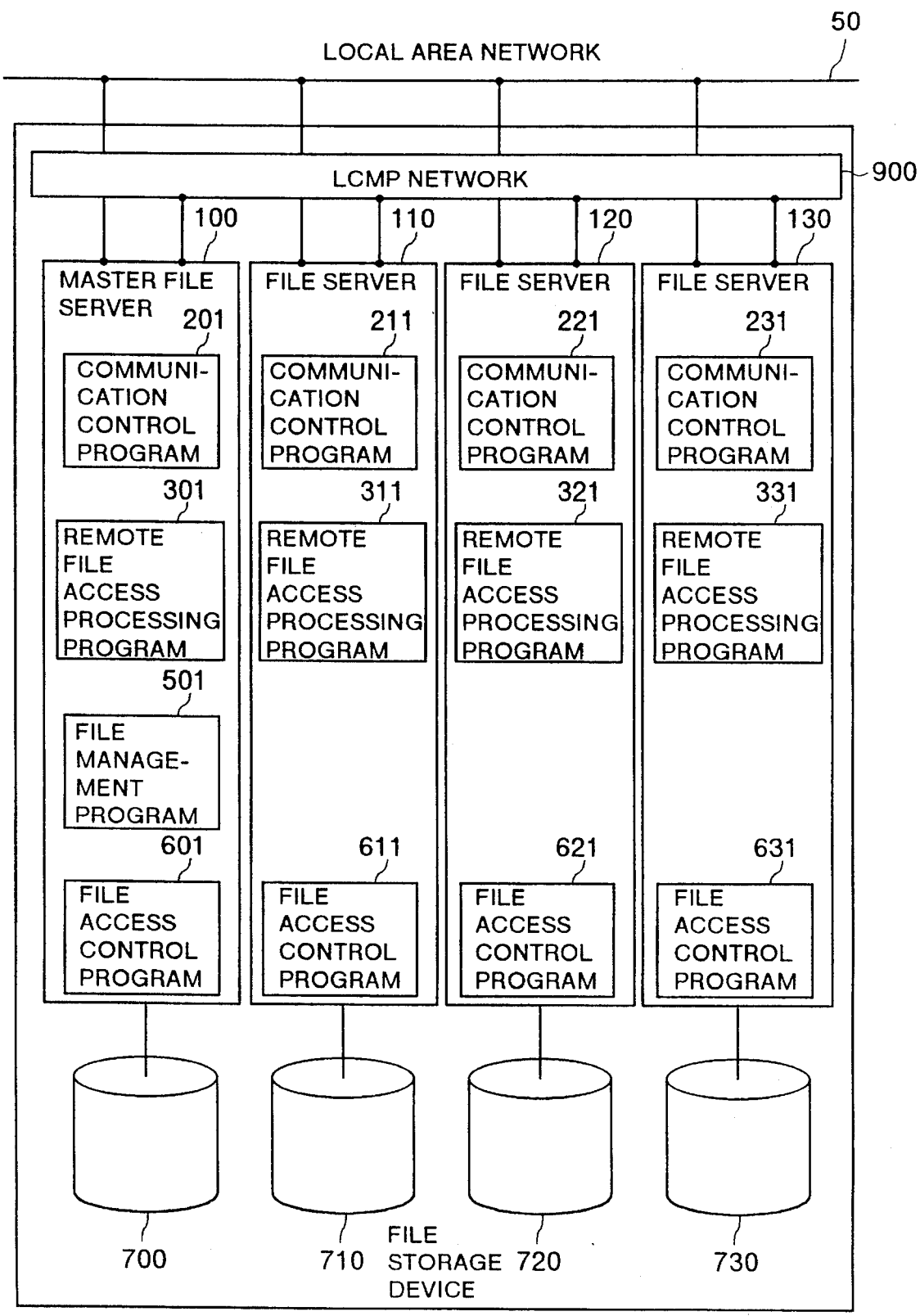
FIG. 12, FIG. 13, FIG. 14, FIG. 15, FIG. 16 and FIG. 17 are block diagrams showing different embodiments of the present invention, respectively.

The file control program 501 is operated as shown in FIG. 9. First, in a file access request receipt program 504, after a file access request from the remote file access processing program 301 is received, it is determined whether the file access request is write or read, and the file distributing program 502 is activated in case of write and the read request scheduling program 503 is activated in case of read. In the file distributing program 502, a file attribute table for a write file is generated, and then, a file server has a small number of unprocessed access demand is determined as a file server for storing a file by referring to a load information table 509. Further, when a duplicate of a file is produced and stored in another file server, a file server having a small number of access request left unprocessed as the file server for storing a duplicate of the file by referring to the load information table 509 again. The information of the file server for storing these files and duplicate files is recorded as a server identifier in the file attribute table 508, and a load information monitoring program 505 is activated. In the read request scheduling program 503, the file attribute table 508 for the file to be read is acquired, and the file server where the file concerned is stored is deduced therefrom. When the file is stored not only in one file server, but also the duplicate thereof is stored in another file server, it is determined which of the file body or the duplicate is to be read by referring to the load information table 509, and the load information monitoring program 505 is activated. In the load information monitoring program 505, the load information is monitored by incrementing the number of access requests left unprocessed for the access objective file server, the information showing the part of the objective file to be made access is sent to a file access control program 601, thus activating the file access control program 601.

Figure 8:
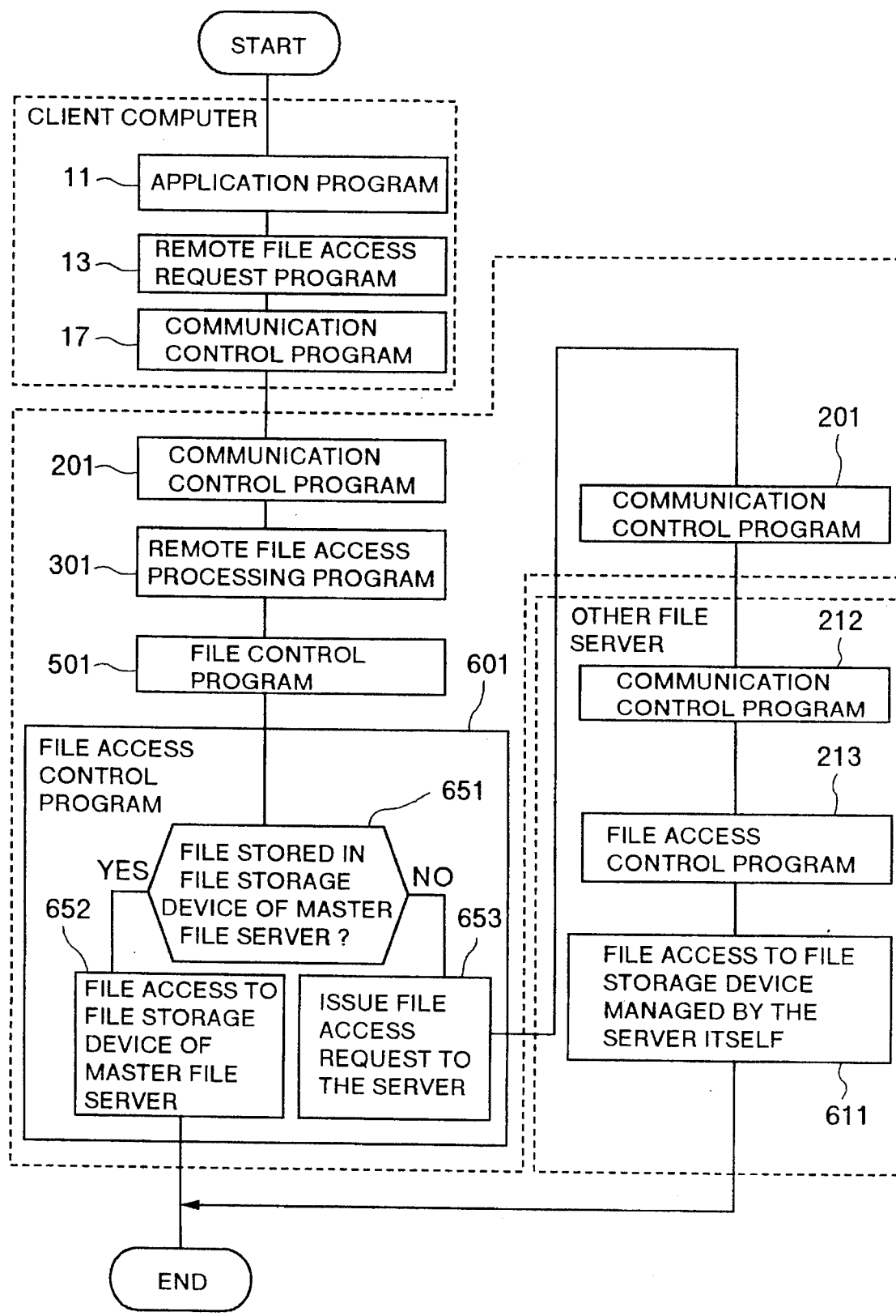
FIG. 8 is a flow chart showing the flow of file access processing in the embodiment.

The file access control program 601 is operated in accordance with processing flow steps 651, 652 and 653 shown in FIG. 8. First, the file storage device identifying program 603 analyzes information delivered from the file control program 501 and determines whether it is access to the file storage device 700 for which the master file server 100 takes charge of access control or access to file storage devices 710 to 730 for which the other file servers 110 to 130 take charge of access control (a step 651). In the case of the former, information on the file storage device 700 is delivered to the file storage device access program 604 of the master file server 100 so as to instruct file access. The file storage device access program 604 starts access to the file storage device 700 upon receipt of the instruction (a step 652). In case of the latter, information on the file storage device is delivered to the interprocessor communication protocol control program 208 in the communication control program 201 and an executive file server of file access is designated so as to request transfer of the request. The interprocessor protocol control program 208 processes these informations so that they may be transferred through the LCMP network 900 and delivers the information to the interprocessor communication device access program 206. The interprocessor communication device access program 206 sends the received file access request to the LCMP network 900 so as to transfer it to the objective file server. Here, description will be made assuming that the file server 110 is the objective file server. In the file server 110 which is the transfer destination of the file access request, an interprocessor communication device access program 212 receives this request and delivers it to an interprocessor communication protocol control program 213. The interprocessor communication protocol control program 213 delivers information on the file storage device to a file storage device access control program 612 in the file access control program 611 when it recognizes that the request is a file access request sent from the master file server 100, i.e., another file server. The file storage device access control program 612 makes access to the objective file of the file storage device.

Next, a way of storing a file in the embodiment is shown in FIG. 10 and FIG. 11. When the load of the file server is monitored in advance by a load information monitoring program, and the file and the duplicate file thereof are stored in two file servers having the lightest load at time of writing file, the combination of two file storage devices in which mirror files having the same contents are stored as shown in a system 108 of FIG. 10 becomes no longer fixed. On the other hand, it is also possible to always fix the pair of two file servers for storing the file and the duplicate file thereof, thereby to form the pair of file data in the file storage device in a mirror structure completely as shown in a system 118 of FIG. 11. In this case, it is also possible to determine the pair of the file servers for storing respective files by determining which load of the pair is lighter among a plurality of pairs of combined file servers. In lieu of the above, all of the file servers are also able to store file data having the same contents.

As described above, according to the present embodiment, it becomes possible to make access to a file server having small file access load by the file distributing program 502 and the read request scheduling program 503 by controlling the number of access requests left unprocessed by the load information monitoring program 505 and monitoring file access loads for respective file servers. Moreover, since the file and the duplicate file thereof are stored in a plurality of file servers, even when access requests from client computers for the same directory or file are generated simultaneously, it becomes possible to distribute these requests in a plurality of file servers. Namely, when a plurality of file servers are connected in parallel on a network so as to share a file among a plurality of client computers, even if the plurality of client computers make access to the same directory or file simultaneously, it is possible to prevent generation of a bottleneck due to concentration of access to a specific file server and lowering of a throughput attendant thereupon, thereby to realize access of high throughput from client computers.

Besides, a case that each processor includes one unit each of file storage device for performing file access control has been shown in the above-mentioned embodiment, but it is apparent that the effects similar to those shown in the present embodiment are obtainable even in such a structure that a plurality of file storage devices are connected to respective file servers so as to enable access control.

Furthermore, even when respective programs such as the file storage device identifying program, the file control program and the file access control program shown in the present embodiment, it is apparent that the effects similar to those shown in the present embodiment are obtainable.

Other embodiments of the present invention are shown in FIG. 12 to FIG. 17, respectively. The embodiment shown in FIG. 12 has a structure that the remote file access processing program existing only in the master file server 100 is also provided in other file servers 110, 120 and 130, respectively. Respective file servers 100, 110, 120 and 130 are connected to one another through the LCMP network 900, and data communication is maintained among them. Furthermore, respective file servers 100, 110, 120 and 130 are connected to the local area network 50. Thus, it becomes possible to receive a file access request by a client computer or a processing request including the file access request through the local area network 50 in all the file servers. For example, when the processing request from a client computer is communicated to the file server 110, a remote file access processing program 311 extracts the file access request by interpreting communication contents and activates a communication control program 211. The communication control program 211 transmits the file access request to the master file server 100 through the LCMP network 900. The master file server 100 determines the file server for storing the file or the file server for executing read by the file control program 501 similarly to the embodiment shown in FIG. 1.

Figure 13:
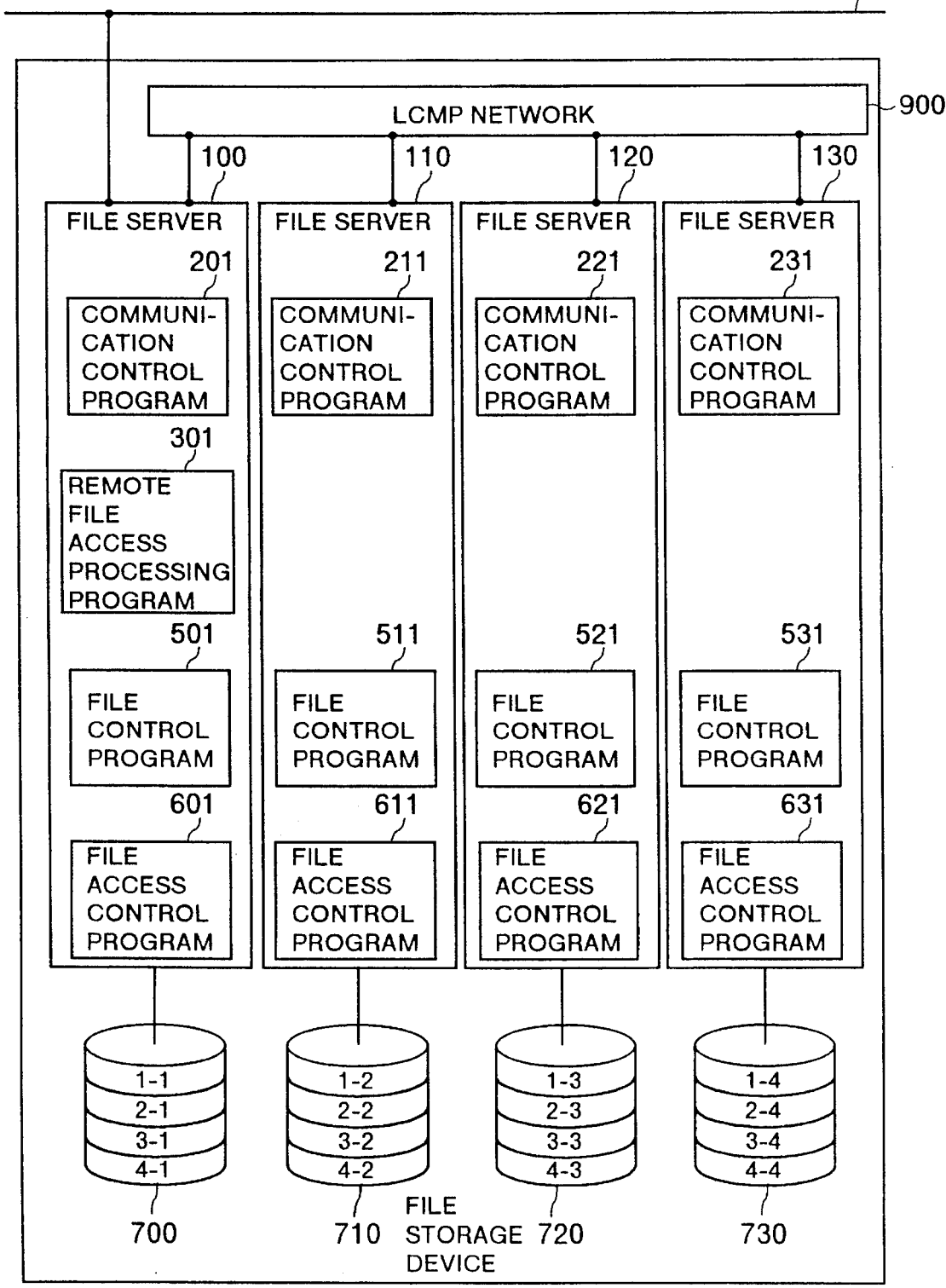

An embodiment shown in FIG. 13 has a structure that the file control program is provided in all of the file servers in lieu of the structure that the file control program exists only in the specific file server 100 in the embodiment shown in FIG. 1. Accordingly, no distinction is made between master and slave among the file servers 100, 110, 120 and 130. Furthermore, storage areas of respective file storage devices 700, 710, 720 and 730 are divided into four sections, respectively. Areas 1-1, 1-2, 1-3 and 1-4 are provided in the first file server 100, but those are areas executed by the file control program 501. Further, areas 2-1, 2-2, 2-3 and 2-4 are provided in the second file server 110 but controlled by the file control program 511, areas 3-1, 3-2, 3-3 and 3-4 are provided in the third file server 120 but controlled by the file control program 521, and areas 4-1, 4-2, 4-3 and 4-4 are provided in the fourth file server 130 but controlled by the file control program 531, respectively. In a word, each file server has an area controllable by itself on a file storage device in which other file servers take charge of access control mutually. The remote file access processing program 301 provided only in the first file server 100 has a function of distributing the extracted file write request among file control programs of respective file servers in consecutive order. According to the present embodiment, it is possible to control the file in the file server system distributedly by four units of file servers, and it becomes possible to execute file control up to four sets in parallel simultaneously in one unit of file server system. Thus, it is possible to obtain the effect of high speed access of the present invention and also to obtain such an effect that further load distribution becomes possible and the degree of parallelism of processing is increased thereby enabling to improve the throughput of the file server system.

Figure 14:
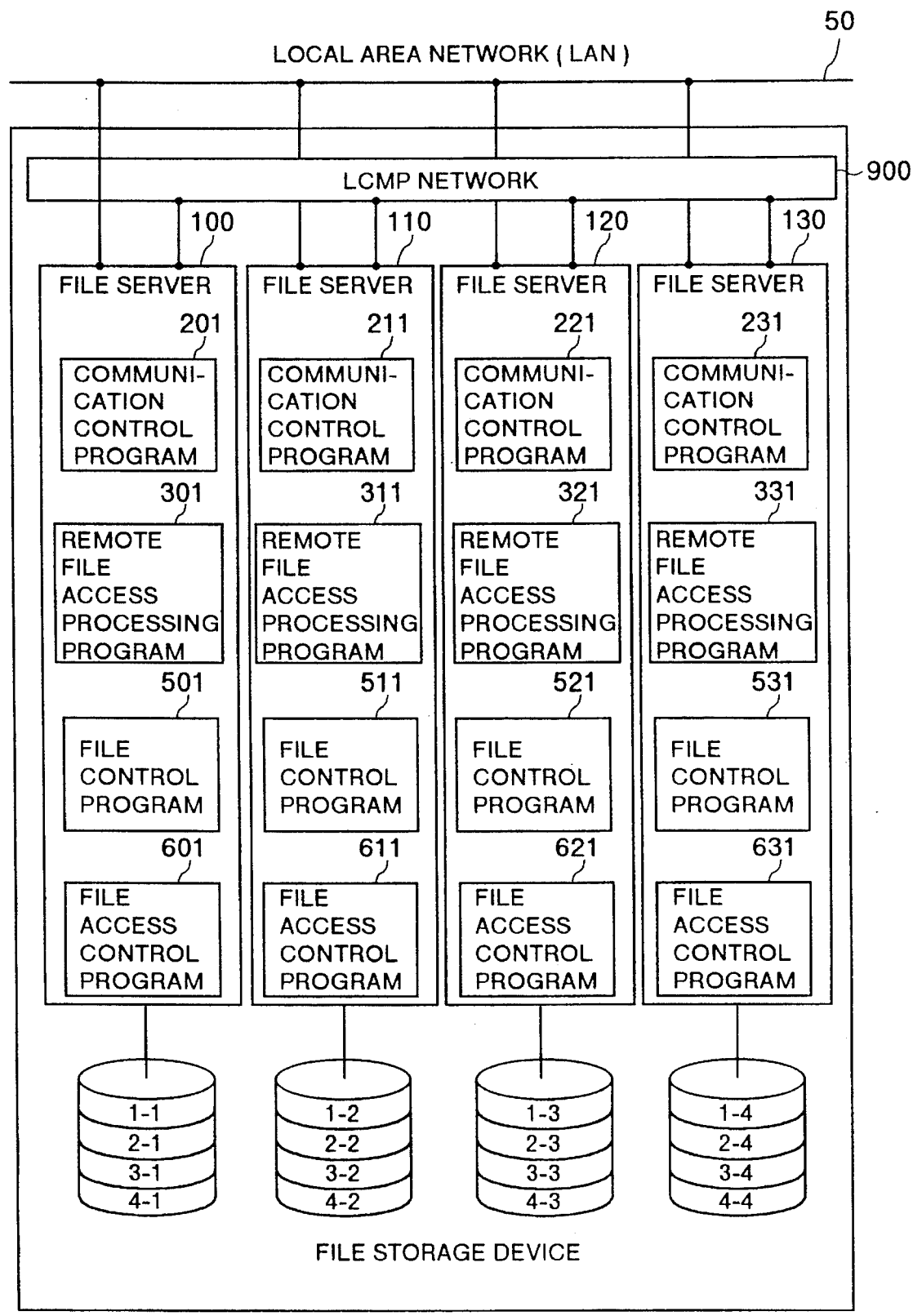

An embodiment shown in FIG. 14 has a structure that the remote file access processing program existing only in the first file server 100 in the embodiment shown in FIG. 13 is provided in all the file servers. According to the present embodiment, it is possible to obtain such an effect that the throughput can be improved by improvement of load distribution and parallelism by distributed control of the file, and also to obtain such an effect that it becomes possible to receive the file access request or the processing request including the file access request through the LAN in all file servers.

Figure 15:
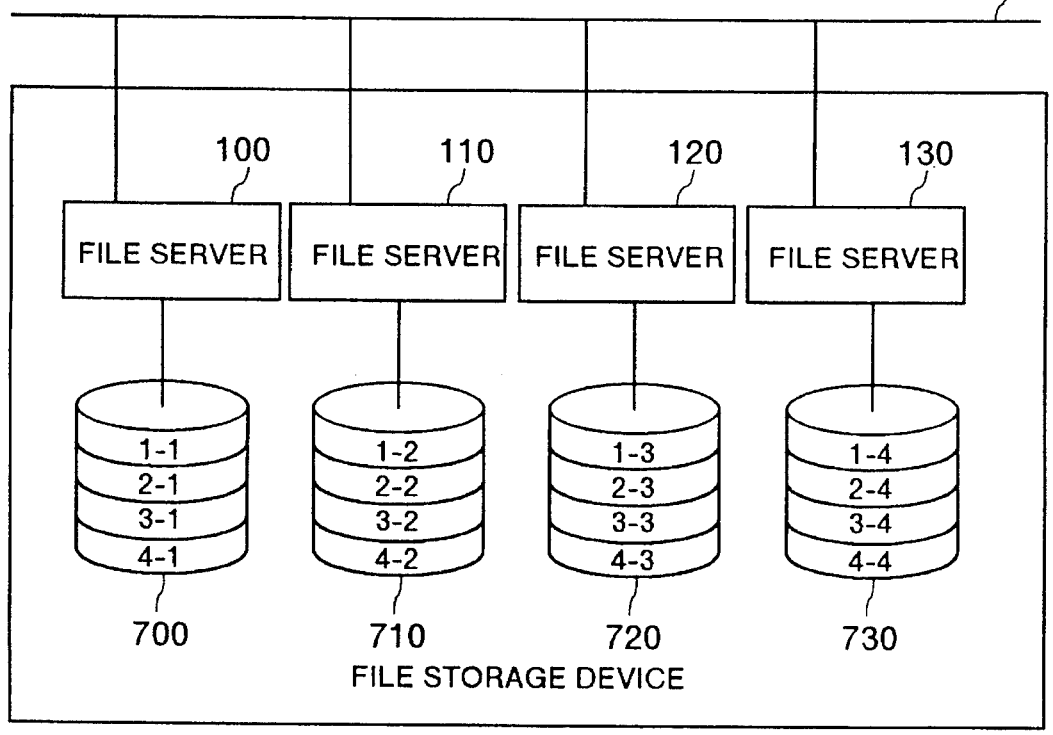

An embodiment shown in FIG. 15 is a file server system having a pseudo-loosely coupled multiprocessor structure in which the communication among file servers is substituted by the local area network 50 without providing an LCMP network among respective file servers. The internal structures of respective file servers 100, 110, 120 and 130 are similar to the embodiment shown in FIG. 14. It is apparent that an effect similar to that obtainable in respective modified embodiments of the first embodiment described above is also obtainable in the file server system of the present embodiment.

Figure 16:
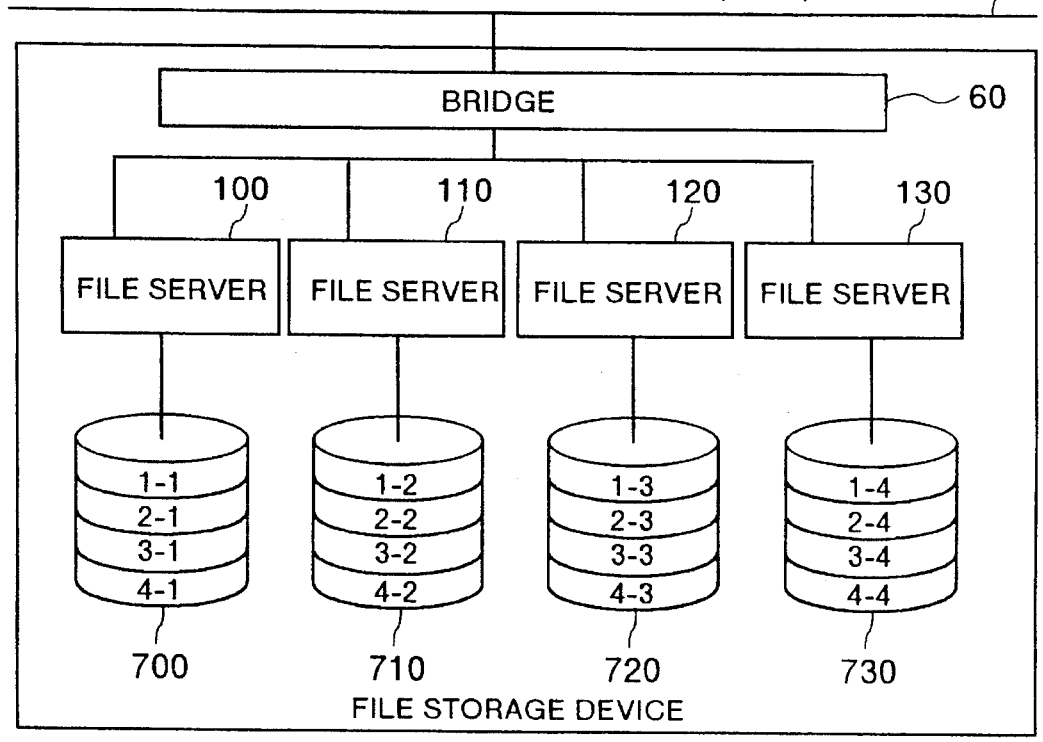

An embodiment shown in FIG. 16 has a structure that a file server system having a pseudo-loosely coupled multiplexer structure is connected to the local area network 50 through a bridge unit 60 having a function of sending the file access request distributedly to respective file servers, and shows an embodiment in which the function similar to that of the embodiment shown in FIG. 15 is realized. The communication among the respective file servers 100, 110, 120 and 130 is performed by using a network inside the bridge unit 60, and is performed through the bridge unit in the case of communication with another communication system. The loads of respective file servers are monitored with the bridge unit 60, and a file server for transmitting the file access request distributedly based on the loads is selected when the bridge unit receives the file access request from a client computer. The effect similar to the effect obtainable in the embodiment shown in FIG. 14 described previously is also obtainable in the file server system of the present embodiment.

Figure 17:
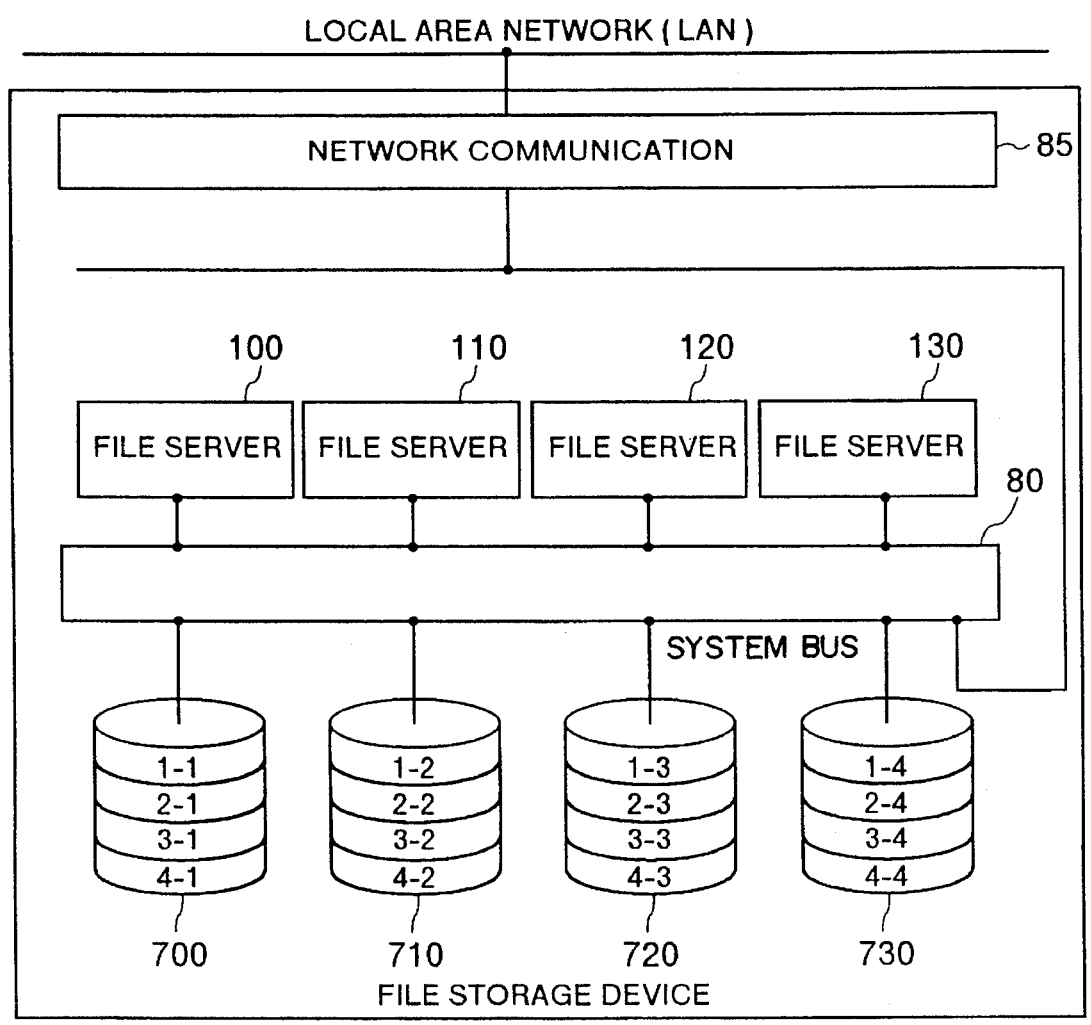

An embodiment shown in FIG. 17 is an embodiment in which a function similar to that of the embodiment shown in FIG. 14 is realized in a file server system having a closely coupled multiprocessor structure. In the file server system of the present embodiment, a system bus 80 is used as an interprocessor communication means, and communication among file servers is executed therethrough. The communication with a client computer is performed by a network communication means connected to the system bus 80. The effect similar to that obtained in respective embodiments described previously is also obtainable in the file server system of the present embodiment.

We claim:

1. A file server system having a plurality of file servers connected in parallel on a network and sharing files placed distributedly in said file servers among a plurality of client computers, comprising in each of said plurality of file servers;

a file storage means for storing files;

a first communication control means for controlling communication with another file server through said network; and a file access control means for receiving a file access request and making file access to said file storage means; and further comprising in a specific file server among said plurality of file servers;

a second communication control means for controlling communication with said client computers;

a remote file access processing means for controlling communication protocol of a file access request issued from said client computers;

a load information monitoring means for measuring respective loads of said plurality of file servers; and a file access request distributing means for referring to the loads measured by said load information monitoring means so as to select a file server making file access from said plurality of file servers, issuing a file access request to the file access control means of its own file server when the selected file server is its own file server, and issuing a file access request to the file access control means of the selected file server through said first communication control means when the selected file server is another file server.

2. A file server system according to claim 1, wherein said load information monitoring means includes means for counting the number of file access requests left unprocessed in each of said plurality of file servers.

3. A file server system according to claim 1, wherein said file access request distributing means includes:

a write-read determining means for determining whether the file access request issued from said client computer is a write request or a read request;

a file division placement means for selecting a file server for storing a file by referring to the load measured by said load information monitoring means at file write time; and an access objective file server scheduling means for selecting a file server which is an object of read from a file server where a read objective file is stored by referring to the load measured by said load information monitoring means at file read time.

4. A file server system according to claim 3, wherein there is provided a file division placement means for selecting at least two or more file servers for storing write objective files.

5. A file server system according to claim 3, wherein said file division placement means selects at least two or more file servers for storing write objective files, and said access objective file server scheduling means refers to loads acquired by said load information monitoring means among those file servers in which read objective files are stored so as to select a file server having a light load as a read objective file server.

6. A file server system according to claim 3, wherein, when a file server for storing a file is selected, said file division placement means generates a file attribute table showing the correspondence relationship between said file and said file server, and said access objective file server scheduling means refers to said file attribute table so as to specify the file server where the read objective file is stored.

7. A file server system according to claim 1, wherein said second communication control means and said remote file access processing means are provided in at least two or more file servers among said plurality of file servers, respectively.

8. A file server system according to claim 1, wherein said load information monitoring means and said file access request distributing means are provided in at least two or more file servers among said plurality of file servers, respectively.

9. A file server system according to claim 7, wherein said load information monitoring means and said file access request distributing means are provided in at least two or more file servers among said plurality of file servers, respectively.

10. A file server system according to claim 1, wherein said client computer is connected to said network, and the function of communication control between said client computer and said specific file server is fulfilled by said first communication control means in lieu of said second communication control means.

11. A file server system according to claim 1, wherein said client computer is connected to a first network, said plurality of file servers are connected to a second network, and said first and second networks are connected to each other by means of a bridge means for distributing a file access request from said client computer to said specific file server.

12. A file server system according to claim 1, wherein said first communication control means communicates with another file server through a system bus.

13. A file server system according to claim 12, wherein said system bus is an exclusive bus used only for communication among said plurality of file servers.

14. A method of controlling file access in a file server system having a plurality of file servers connected in parallel on a network and sharing files placed distributedly in said plurality of file servers of said file among a plurality of client computers, comprising the steps of:

storing same file data in said plurality of file servers;

measuring respective load information of said plurality of file servers;

referring to said load information so as to select a file server making file access when a file access request issued from one of said client computer through said network is received; and distributing the file access request to said selected file server.

15. A method of controlling file access according to claim 14, wherein said step of measuring load information includes a step of counting the number of respective file access requests left unprocessed of said plurality of file servers.

16. A method of controlling file access according to claim 14, wherein the step of selecting said file server making file access includes the steps of:

determining whether the file access request issued from the client computer is a write request or a read request;

referring to the measured loads so as to select a file storage objective file server at file write time; and referring to the measured loads so as to select read objective file server from a file server where a read objective file is stored.

17. A method of controlling file access according to claim 16, wherein at least two or more file servers for storing a write objective file are selected in said step of selecting the file storage objective file server.

18. A method of controlling file access according to claim 16, wherein a file server having a light load is selected based on measured load information among a plurality of file servers in which the read objective file is stored so as to adopt the file server as a read objective file server.

19. A method of controlling file access according to claim 16, wherein, when a file server for storing a file is selected, a file attribute table showing correspondence relationship between said file and said file server is generated, and said access objective file server scheduling means refers to said file attribute table so as to specify a file server in which a read objective file is stored.

20. A method of controlling file access at a high speed according to claim 14, wherein said step of selecting the file access objective file server includes the steps of:

measuring load information on respective file servers in at least two or more file servers;

receiving the file access request issued from the client computer with a file server measuring said load information;

referring to said load information so as to select a file access objective file server; and distributing the file access request to the file server selected as the file access objective file server.

21. A method of controlling file access according to claim 20, wherein said step of selecting the file access objective file server includes the steps of selecting a file server having little load as a write objective file server when file access is file write, and selecting a file server having little load from the file servers in which files are stored as a read objective file server when file access is file read.

* * * * *